United States Patent Office 3,516,970
Patented June 23, 1970

1

3,516,970
DIRECT SYNTHESIS OF POLYMERIC SCHIFF BASES FROM TWO AMINES AND TWO ALDEHYDES
James E. Webb, Administrator of the National Aeronautics and Space Administration, with respect to an invention of Gaetano F. D'Alelio, Notre Dame, Ind.
No Drawing. Filed Nov. 9, 1966, Ser. No. 593,593
Int. Cl. C08g 9/06
U.S. Cl. 260—72.5                     5 Claims

ABSTRACT OF THE DISCLOSURE

Schiff-base polymers having the formula

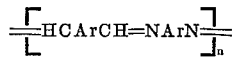

where Ar is an arylene moiety are prepared by reacting an aromatic diamine of the formula $H_2NArNH_2$ with an aromatic dialdehyde of the formula OHCArCHO, an aromatic monoamine of the formula $RNH_2$ and an aromatic monoaldehyde of the formula RCHO where R is an aryl radical. A mixture of the four reactants is heated to 250° C. to 300° C. to produce a fusible black polymer. Heating to higher temperatures removes by-product monofunctional Schiff base and converts the polymer to infusible form.

---

The invention described herein was made in the performance of work under a NASA grant and is subject to the provisions of Section 305 of the National Aeronautics and Space Act of 1958. Public Law 85–568 (72 Stat. 435; 42 U.S.C. 2457).

This invention relates to processes for the synthesis of Schiff-base polymers.

Polymeric Schiff bases of the general formula

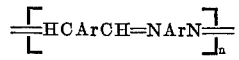

where Ar represents an arylene moiety, exhibit outstanding heat resistant properties. Polymers having this structure can withstand temperatures in excess of 400° C. for sustained periods without undergoing significant degradation or phase changes. This high degree of thermal stability is believed to result from the conjugated structure of the polymer, the double bond —C=N— linkage characteristics of Schiff bases being alternated with arylene groups. Schiff-base polymers offer an attractive material for applications in the aerospace field as well as for other uses requiring high-temperature stability.

Schiff base polymers have been prepared previously by a condensation reaction of an aromatic dialdehyde with an aromatic diamine in a solution system, for example, by reaction of terephthaldehyde with p-phenylenediamine in benzene or alcohol. The product of this reaction has been a yelow-to-orange "brick dust" powder having a low molecular weight, approximately that of a dimer. The "brick dust" polymer is an intractable material, infusible and insoluble in most solvents and therefore not amenable to fabrication into useful products. Black polymers should be expected from these reactants if the molecular weight is sufficiently high that conjugation is extensive. It is desired to prepare these polymers in the form of tractable, black high-molecular-weight material suitable for further processing.

Black Schiff-base polymers have now been prepared by reacting the aromatic diamine and aromatic dialde-

2 hyde in a melt system, a mixture of the reagents being heated to a temperature above the melting point. Polymerization to a high molecular weight proceeds very rapidly under these conditions, but the reaction is difficult to control, and this process does not permit the ready isolation of a tractable, fusible polymer at an intermediate stage. Better control over this reaction has been achieved by use of a molten monofunctional Schiff base such as benzylideneaniline for the reaction medium, the monofunctional Schiff base serving both as a solvent and moderator for the reaction. This process is the subject matter of applicant's application Ser. No. 593,595, filed No. 9, 1966. Further improvement has been obtained by employing Schiff-base exchange reactions wherein difunctional Schiff bases are reacted with an aromatic diamine, an aromatic dialdehyde or another difunctional Schiff base to prepare the Schiff-base polymers. These reactions, and particularly the bis-exchange reaction of a Schiff base having an aromatic diamino moiety with a Schiff base having an aromatic dialdehyde moiety, proceed more slowly than the diamine-dialdehyde condensation reaction so that isolation of a fusible, tractable polymer is facilitated. The Schiff-base exchange processes and polymers formed thereby are the subject matter of applicant's application Ser. No. 593,594, filed Nov. 9, 1966.

Schiff-base exchange reactions present a disadvantage in that they require as starting material a difunctioinal Schiff base, which reagent is expensive or unavailable so that it must be synthesized. A process retaining the ease of control of Schiff-base exchange reactions, but eliminating the need for a difunctional Schiff base starting material would be highly desirable.

It is therefore an object of this invention to provide an improved process for synthesizing Schiff base polymers.

Another object is to provide a process for preparing Schiff-base polymers in a tractable, fusible form suitable for further processing.

Another object is to provide a process for preparing fusible, tractable Schiff-base polymers which does not require a difunctional Schiff base as starting material.

Other objects and advantages of this invention will be apparent from the following description.

In the present invention Schiff-base polymers having the formula

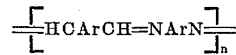

are prepared by reacting an aromatic diamine with an aromatic dialdehyde, an aromatic monoamine, and an aromatic monoaldehyde. This reaction proceeds in a controllable manner similar to Schiff-base exchange reactions, but a difunctional Schiff base reagent is not required. The amine and aldehyde reactants required are readily available at relatively low cost so that substantial savings are realized.

Although this invention is not to be understood as limited to a particular theory, it is postulated that polymerization occurs both by a condensation of the dialdehyde with the diamine and by Schiff-base exchange reactions. The latter mechanism occurs in two stages; in the first stage the dialdehyde reacts with the monoamine to produce a Schiff base having an aromatic diamino moiety, and the diamine reacts with the monoaldehyde to produce a Schiff base having an aromatic dialdehyde moiety. These reactions as exemplified for the specific reactants p-phenylenediamine, terephthaldehyde, benzaldehyde and aniline, proceed as follows:

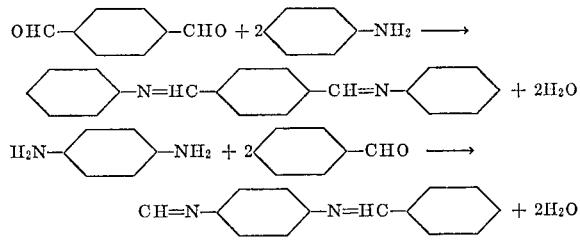

The two resulting difunctional Schiff bases can enter into three polymerization reactions in the second stage. The two Schiff bases can undergo a bis exchange reaction with one another to produce a Schiff base polymer and a monofunctional Schiff base by-product. The bulk of the polymer is believed to be formed by this means and by the condensation reaction of the dialdehyde with the diamine. The Schiff base having a difunctional amino moiety can also react with the dialdehyde to produce the polymer by means of a carbonyl exchange reaction, and the Schiff base having the difunctional aldehyde moiety can react with the diamine to give the polymer by means of amine exchange. The overall reaction is represented by the following equation:

$nAr(CHO)_2 + nAr(NH_2)_2 + mRCHO + mRNH_2 \longrightarrow$

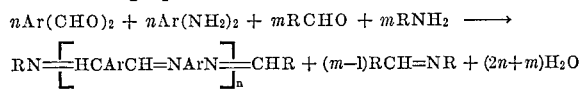

where Ar is an arylene moiety and R is an aryl moiety.

The by-products of the overall reaction are water, which is rapidly volatized at the polymerization reaction temperature, and a monofunctional Schiff base which remains in the reaction mixture and serves to moderate and control the extent of polymerization until removed by volatilization at higher temperatures.

The aromatic diamine reactant in the present process is represented by the formula $$H_2NArNH_2$$

where Ar is an arylene moiety. The arylene moiety can be a single phenylene ring structure such as m-phenylene, p-phenylene or a phenylene ring having one or two hydrogen atoms substituted by methyl groups; a diphenylene group; or a group consisting of two phenylene rings linked by one or more heteroatoms as groups such as O, S, $SO_2$, C=O, NH, N—$CH_3$, $C_2H_2$, or $CH_2$, and $SO_2$. Aliphatic chain linkages containing more than one methylene group are excluded from the groups between phenylene rings since the conjugated structure of the polymer backbone, which is critical to thermal stability, would not be attained. In the latter groups the linkages attached to the phenylene rings can be in the meta-meta, para-para, or para-meta positions. Illustrative examples of specific amine reactants are p-phenylenediamine, m-phenylenediamine and the p, p'; p, m'; and m, m'; forms of bianiline, diaminodiphenyl methane, diaminodiphenyl oxide, diaminodiphenyl sulfide, diaminodiphenyl sulfone, diaminodiphenyl amine, diaminodiphenyl ethylene and diaminostilbene. Since the thermal stability and other properties of the product polymer are not substantially affected by the particular arylene moiety in the diamine component, the least expensive amine reactant, m-phenylenediamine, is preferred.

The aromatic dialdehyde reactant is represented by the formula $$OHCArCHO$$

where Ar is an arylene moiety. Ar can be of any of the groups given above for Ar in the diamine reactant. Examples of specific dialdehydes which can be used include m-phthaldehyde, terephthaldehyde and the p, p'; p, m'; and m, m' forms of diformyldiphenyl methane, diformyldiphenyl oxide, diformyldiphenyl sulfide, diformyldiphenyl sulfone, diformyldiphenyl ketone, diformyldi-  phenyl methyl amine, diformyldiphenyl ethylene, diformyldiphenyl acetylene, etc. The meta and para phthaldehydes are preferred because of their availability and lower cost.

The aromatic monoamine reactant is represented by the formula $$RNH_2$$

where R is an aryl radical. R can be $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$, $CH_3OC_6H_4$, etc. Illustrative examples of specific amines included are aniline, and o-, m-, and p-toluidine. The simplest and least expensive amine in this class, aniline, is preferred.

The aromatic monoaldehyde is represented by the formula $$RCHO$$

where Ar is an aryl radical. R can be any of the aryl radicals given for R in the monoamine reactant. Illustrative examples of specific aldehydes included are benzaldehyde, and o-, m-, and p-tolualdehyde.

Polymerization is carried out by heating a mixture of the diamine, dialdehyde, monoamine, and monoaldehyde. In a preferred procedure the diamine and the dialdehyde are mixed at equimolar proportions and this mixture is combined with an equimolar mixture of the monoamine and the monoaldehyde. The molar ratio of the dialdehyde-diamine mixture to the monoaldehyde-monoamine mixture can vary from 1:1 to 1:3, depending on the particular dialdehyde and diamine used. The ratio required to produce a homogeneous, viscous melt depends on the isomeric nature of the diamine and dialdehyde. For example, a higher proportion of monoamine-monoaldehyde is required for reaction mixtures using p-diamine and p-dialdehyde than for the corresponding meta forms.

The mixture is heated to a temperature of at least 250° C., and preferably 250° C. to 300° C., and held at this temperature for about two to five hours to produce a fusible black polymer. The mixture is initially formed as a pasty yellow mixture upon combining the liquid monoaldehyde and monoamine with the difunctional reagents, which are solids. Upon being heated the mixture forms a solid and then a viscount melt. The mixture can be heated rapidly to 250° C. or higher, but preferably it is heated at a temperature increase rate of 10° to 30° C. per hour. Polymerization proceeds through increasing stages of molecular weight during heating as evidenced by vivid changes in color of the melt from a bright yellow-orange to dark brown to black. An equillibrium stage is reached upon holding at 250° to 300° C., and no further polymerization will occur until the by-product monofunctional Schiff base is removed. The product polymer is then recovered by removing the monofunctional Schiff base, preferably by distillation at a temperature of 300° to 350° C.

In an alternate procedure the four reagents are firs* reacted in a solution system to produce a low-molecular-weight polymeric mixture prior to heating to higher temperatures. This reaction can be carried out by dissolving the diamine, dialdehyde, monoamine and monoaldehyde in an azeotroping hydrocarbon solvent such as benzene or toluene and heating the solution in a Dean-Stark apparatus until the water is no longer eliminated. The resulting condensation product is then recovered by distilling off the solvent. The product can then be converted to high-molecular weight form by heating in the manner described above. The product polymer, in the form of a fusible, black coherent mass, can be polymerized further in the solid state by heating to a temperature not exceeding about 375° C. This treatment serves to improve the mechanical properties of the polymer. Higher temperatures are normally to be avoided since the polymers would be rendered infusible and untractable. However, if subsequent shaping or melting of the product is not desired the polymer can be converted to an infusible.

thermally stable form by heating to higher temperatures, for example, 400° to 600° C. at this stage.

In order to avoid oxidation and side-reactions the polymerization reaction and subsequent heating steps are carried out in the absence of moisture and oxygen. The provision of an atmosphere of an inert gas such as nitrogen, helium or argon is suitable for this purpose. For this reason and to allow removal of reaction by-products the reaction is conducted in apparatus provided with distilling equipment and an inert gas inlet. Gas pressure over the reaction mixture is not critical, but a substantially reduced pressure, for example, down to 1 mm. Hg. is preferred in the later heating stages to enhance the removal of volatilized by-products.

The fusible polymer product obtained as described above has a relatively high molecular weight, estimated to be in excess of 20,000, although the insolubility of the polymer has prevented an exact determination. Upon being heated to higher temperatures this material undergoes additional polymerization in the solid state to produce an infusible, tough solid with excellent high-temperature stability and good mechanical properties. Fabrication of the polymer into the desired shape or structure is carried out while it is in the fusible stage because of the intractable nature of the infusible material.

In a preferred fabrication procedure the fusible polymer is ground or crushed, and the resulting particles are compressed into the desired shape and heated to a temperature of 400° to 600° C. to effect further solid-state polymerization and consolidation. This reaction is enhanced by providing a small amount, for example, 0.5 to 1 weight percent of a Lewis acid catalyst in the polymer body prior to heating. Examples of suitable Lewis acid catalysts include zinc chloride, aluminum chloride, boron trifluoride, titanium tetrachloride, zirconium tetrachloride, mercuric bromide, cobolt iodide, nickel sulfate, cadminum nitrate, cadmium chloride, silicon tetrachloride, arsenic tribromide, antimony pentabromide, bismuth trichloride, tin tetrachloride, trimethylamine hydrochloride, trimethylamine hydrobromide, phosphoric acid, tributylphosphonium chloride and p-toluenesulfonic acid. Holding at 400° to 600° C. for a period of 5 to 20 minutes is generally suitable, although longer times are necessary for massive structures. During this treatment, small amounts of reactant by-products are formed, and they as well as any remaining monofunctional Schiff base can be removed by further heating the molded form under an inert atmosphere at a temperature of 700° to 1,000° C. for 1 to 4 hours or more. The latter treatment serves to impart a higher degree of thermal stability to the final product.

For the fabrication of composite heat shields, for which Schiff base polymers are a particularly attractive material, the fusible polymer can be intermingled with other desired components of the composite, for example, reinforcing fibers of a refractory material such as fiberglass or silica, prior to the 400° to 600° C. heat treatment.

The invention is illustrated by the following examples:

EXAMPLE I

Equimolar quantities (0.004 M each) of benzaldehyde, aniline, p-phenylenediamine, and terephthaldehyde are mixed in a reaction tube. The resulting mixture immediately turns yellow and solidifies. The tube is then fitted with a condenser, a receiver, and a nitrogen inlet, and the mixture is heated to 220° C. for two hours under atmospheric pressure. During heating the mixture melts and changes in color from yellow to brown-black. The mixture is then cooled, and 0.824 gram of black amorphous polymer is recovered. Water and benzylidene aniline are found in the receiver.

EXAMPLE II

The reactants of Example I are mixed at the same quantities, the two amines being first combined in a mortar and the two aldehydes being added thereto with rapid stirring. The mixture rapidly forms a pasty mass and then a solid. The solid is then removed from the mortar and placed in the reaction tube of Example I. The mixture is then heated under a nitrogen atmosphere for two hours at 220° to 400° C., 19 hours at 400° C., all at atmospheric pressure, and for 4 hours at 400° C. and 1.5 mm. Hg pressure. The mixture is then allowed to cool, and a dull, black amorphous polymer is recovered at a yield of 100%. Benzylideneaniline is found in the receiver, and water and aniline in an attached Dry Ice-acetone trap.

EXAMPLE III

The reactants of Example I are mixed in a mortar by the procedure of Example II. The mixture is not solidified at room temperature, but does solidify upon cooling the motar in Dry Ice. The resulting cold glassy mixture is then transferred to a reaction tube and heated under a nitrogen atmosphere to 260° C. for twelve and one-half hours, to 370° C. for one hour, to 414° C. for seven hours, all at atmospheric pressure, and to 360° for nine hours at 1.5 mm. Hg pressure. The mixture is then cooled, and a black, shiny polymer is recovered.

EXAMPLE IV

A series of polymerization reactions is conducted by the following procedure. For each reaction an arylene diamine, either p- or m-phenylenediamine, is mixed with an arylene dialdehyde, either p- or m-phthaldehyde, at equimolar proportions, and the mixture is placed in a glass polymerization reactor. Aniline and benzaldehyde are then added at varying molar proportions. The reactor is then flushed with nitrogen and heated under a nitrogen atmosphere according to the following schedule: one hour at 120° C., one hour at 200° C., and four hours at 300° C., all at atmospheric pressure, to produce a fusible, black polymer. The mixture is then heated at 300° C. for four hours at 0.5 to 1.5 mm. Hg and for eighteen hours at 400° C. at 0.5 to 1.5 mm. Hg. The mixture is then cooled, and the yield is determined. In a number of cases, a sample of the product is then ground and heated under nitrogen for one hour at 600° C. at atmospheric pressure and for four hours at 600° C. and 0.5 to 1.5 mm. Hg. The final yield at this temperature is then determined. The results obtained may be seen by reference to the following table:

DATA ON DIRECT SYNTHESES OF POLY SCHIFF BASES

| One mole diamine $H_2NC_6H_4NH_2$ | One mole dialdehyde $OHCC_6H_4CHO$ | Moles $C_6H_5NH_2$ | Moles $C_6H_5CHO$ | Percent yield at 400° C. | Percent yield at 600° C. |
|---|---|---|---|---|---|
| Meta | Meta | 0.5 | 0.5 | 111 | |
| Do | do | 1.0 | 1.0 | 118 | 102 |
| Do | do | 2.0 | 2.0 | 164 | 132 |
| Do | do | 3.0 | 3.0 | 182 | 114 |
| Do | Para | 0.5 | 0.5 | 111 | |
| Do | do | 1.0 | 1.0 | 112 | 99 |
| Do | do | 2.0 | 2.0 | 153 | 130 |
| Do | do | 3.0 | 3.0 | 181 | 155 |
| Para | Meta | 1.0 | 1.0 | 83 | 70.1 |
| Do | do | 2.0 | 2.0 | 79 | 67.8 |
| Do | do | 3.0 | 3.0 | 113 | 90.6 |
| Do | Para | 1.0 | 1.0 | 127 | 101 |
| Do | do | 2.0 | 2.0 | 158 | 68.4 |
| Do | do | 3.0 | 3.0 | 120 | 99.6 |

Yields in excess of 100% of theory are due to the retention of by-products such as benzylidene aniline, which is held tenaciously by the polymer; the excess can be removed by prolonged heating of the ground polymer at 300° to 400° C. or for shorter times at 600° C. or higher under an inert atmosphere.

EXAMPLE V

A mixture of one mole of m-phenylenediamine, one mole of m-phenylenedialdehyde, two moles of aniline and two moles of benzaldehyde as 10% solution in toluene are reacted in a Dean-Stark apparatus at reflux until no more water of condensation is collected in the side arm trap. The condensation product is recovered by distilling off the toluene at 15 mm. Hg pressure, leaving a quantitative yield of product. The product was transferred to the glass polymerization reactor and heated according to the schedule of Example IV. The yield of black polymer at 400° was 125° and at 600° C., it was 103%.

The thermal stabilities of the polymers prepared by the process of this invention are substantially identical to those prepared by the bis Schiff-base exchange process disclosed in my copending application Ser. No. 593,594, filed Nov. 9, 1966, and assigned to the same assignee and to which reference is hereby made. The polymers obtained in the present process differ only in their end groups, the present polymers having end groups characteristics of both dialdehydediamine condensation prepared polymers and Schiff-base exchange prepared polymers. These differences in structure do not substantially affect bulk properties of the polymer. In contrast to polymers prepared by previously known solution methods in which the value of $n$ was about 2, the polymers prepared by the present process have a value of $n$ of at least 5 for the fusible material prepared in the initial heating stage and over 20 for the 400° to 600° C. heated product. Further heating in the range of 700° to 1,000° C. may increase the value to 100 to 1,000 or more. The thermal stabilities of these polymers are orders of magnitude higher than the thermal stabilities of polymers prepared by solution condensation of dialdehydes and diamines. This greatly improved thermal stability was unpredictable and entirely unexpected.

What is claimed is:

1. A process for preparation of a polymer consisting essentially of repeating units of the formula

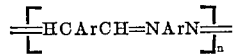

where $n$ has a numerical value of at least 5 and Ar is an arylene moiety selected from the class consisting of a phenylene group, a diphenylene group and a group consisting of two phenylene groups linked by a component of the class consisting of O, S, $SO_2$, $CH_2$, $C_2H_2$, $CH_2$ and $SO_2$, $N-CH_3$, $C=O$, and NH which comprises combining an aromatic diamine of the formula $H_2NArNH_2$ where Ar is said arylene moiety with an aromatic dialdehyde of the formula OHCArCHO where Ar is said arylene moiety, an aromatic monoamine of the formula $RNH_2$ where R is an aryl radical selected from the group consisting of $C_6H_5$, $CH_3C_6H_4$, $(CH_3)_2C_6H_3$, $(CH_3)_3C_6H_2$, $C_6H_5C_6H_4$, $C_6H_5OC_6H_4$, $C_6H_5SC_6H_4$, and $CH_3OC_6H_4$ and an aromatic monoaldehyde of the formula RCHO where R is said aryl radical, heating the resulting mixture under an inert atmosphere to a temperature of at least 250° C. whereby a black polymer is formed and recovering said polymer.

2. The process of claim 1 wherein said diamine and said dialdehyde are combined at equimolar proportions, said monoamine and said monoaldehyde are combined at equimolar proportions and the molar ratio of said dialdehyde and said diamine to said monoaldehyde and said monoamine is from 1:1 to 1:3.

3. A process for preparation of a fusible polymer consisting essentially of repeating units of the formula

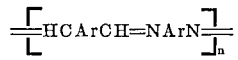

where $n$ has a numerical value of at least 5 and Ar is an arylene moiety selected from the class consisting of a phenylene group, a diphenylene group and a group consisting of two phenylene groups linked by a component of the class consisting of O, S, $SO_2$, $CH_2$, $C_2H_2$, $CH_2$, and $SO_2$, $N-CH_3$, $C=O$, and NH which comprises combining an aromatic diamine of the formula $H_2NArNH_2$ where Ar is said arylene moiety with an aromatic dialdehyde of the formula OHCArCHO where Ar is said arylene moiety, an aromatic monoamine of the formula $RNH_2$ where R is an aryl radical selected from the group consisting of $C_6H_5$, $CH_3C_6H_4$, $(CH_3)_2C_6H_3$, $(CH_3)_3C_6H_2$, $C_6H_5C_6H_4$, $CH_5OC_6H_4$, $C_6H_5SC_6H_4$ and $CH_3OC_6H_4$ and an aromatic monoaldehyde of the formula RCHO where R is said aryl radical, heating the resulting mixture to a temperature of about 250° to 300° C. under an inert atmosphere whereby a fusible black polymer is formed and recovering said polymer.

4. The process of claim 3 wherein said mixture is held at said temperature for 2 to 5 hours.

5. The process of claim 3 wherein said arylene moiety is phenylene.

References Cited

UNITED STATES PATENTS 3,340,232   9/1967   Smith et al. _____ 260—72.5

WILLIAM H. SHORT, Primary Examiner

E. M. WOODBERRY, Assistant Examiner

U.S. Cl. X.R.

260—37, 47, 65